US008829083B2

(12) United States Patent
Lundgard et al.

(10) Patent No.: US 8,829,083 B2
(45) Date of Patent: Sep. 9, 2014

(54) COATING COMPOSITION, A PROCESS OF PRODUCING A COATING COMPOSITION, A COATED ARTICLE, AND A METHOD OF MAKING SUCH ARTICLES

(75) Inventors: Richard A. Lundgard, Midland, MI (US); Jodi M. Mecca, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 13/131,057

(22) PCT Filed: Nov. 23, 2009

(86) PCT No.: PCT/US2009/065446
§ 371 (c)(1),
(2), (4) Date: May 25, 2011

(87) PCT Pub. No.: WO2010/074865
PCT Pub. Date: Jul. 1, 2010

(65) Prior Publication Data
US 2011/0245369 A1 Oct. 6, 2011

Related U.S. Application Data

(60) Provisional application No. 61/122,921, filed on Dec. 16, 2008.

(51) Int. Cl.
| | | |
|---|---|---|
| C08K 3/02 | (2006.01) | |
| C09D 7/12 | (2006.01) | |
| C08K 3/00 | (2006.01) | |
| C09C 1/04 | (2006.01) | |
| C09C 1/30 | (2006.01) | |
| C09C 1/36 | (2006.01) | |
| C09C 1/40 | (2006.01) | |
| C09C 3/10 | (2006.01) | |
| C09D 5/02 | (2006.01) | |
| C09D 17/00 | (2006.01) | |
| C08K 3/22 | (2006.01) | |
| C08K 9/08 | (2006.01) | |

(52) U.S. Cl.
CPC ............ C09D 7/1225 (2013.01); C08K 3/0033 (2013.01); *C01P 2004/04* (2013.01); *C01P 2004/62* (2013.01); C08K 3/22 (2013.01); *C08K 9/08* (2013.01); *C09C 1/043* (2013.01); *C09C 1/3072* (2013.01); *C09C 1/3676* (2013.01); *C09C 1/407* (2013.01); *C09C 3/10* (2013.01); *C09D 5/028* (2013.01); *C09D 17/007* (2013.01); *C09D 17/008* (2013.01)
USPC ............ 524/80; 524/280; 524/379; 524/449; 524/502; 427/331

(58) Field of Classification Search
CPC ........ C08K 3/0033; C08K 3/22; C08L 23/04; C08L 23/06; C08L 23/08; C08L 23/0807; C08L 23/0815; C08L 23/0823
USPC .......... 523/122; 524/186, 280, 379, 449, 502, 524/556, 579, 80; 427/331
See application file for complete search history.

(56) References Cited

U.S. PATENT DOCUMENTS

| | | | |
|---|---|---|---|
| 3,645,992 A | | 2/1972 | Elston et al. |
| 3,686,359 A | | 8/1972 | Soldatos et al. |
| 3,993,612 A | * | 11/1976 | Aihara et al. ................ 524/559 |
| 4,066,628 A | | 1/1978 | Ashida et al. |
| 4,076,698 A | | 2/1978 | Anderson et al. |
| 4,438,254 A | | 3/1984 | Doorakian et al. |
| 4,480,082 A | | 10/1984 | Mclean et al. |
| 4,499,143 A | * | 2/1985 | Panush ........................ 428/336 |
| 4,599,392 A | | 7/1986 | Osborne et al. |
| 4,608,401 A | | 8/1986 | Martin |
| 4,988,781 A | | 1/1991 | Osborne et al. |
| 5,089,588 A | | 2/1992 | White et al. |
| 5,115,075 A | | 5/1992 | Brennan |
| 5,171,820 A | | 12/1992 | Mang |
| 5,218,031 A | * | 6/1993 | Nayder et al. ................ 524/376 |
| 5,246,751 A | | 9/1993 | White |
| 5,252,658 A | * | 10/1993 | Dethlefs et al. .............. 524/492 |
| 5,272,236 A | | 12/1993 | Lai |
| 5,504,172 A | | 4/1996 | Imuta |
| 5,938,437 A | | 8/1999 | DeVincenzo |

(Continued)

FOREIGN PATENT DOCUMENTS

| | | |
|---|---|---|
| DE | 2104044 | 9/1971 |
| EP | 732379 | 9/1996 |

(Continued)

OTHER PUBLICATIONS

"Opacity and whiteness." Titanium Dioxide Center Dupont, 1995-2002 [retrieved Dec. 4, 2011] Retrieved on Internet <URL:http://www.specialchem4polymers.com/tc/titanium-dioxide/index.aspx?id=benefits_opacity>.*
Patent Examination Report No. 2 for counterpart Australian Patent Application No. 2009330594 dated Oct. 11, 2013.
Second Office Action for counterpart Chinese Patent Application No. 200980156787.8 dated Dec. 3, 2013.
Response to Second Office Action for counterpart Chinese Patent Application No. 200980156787.8 filed Feb. 18, 2014.

(Continued)

*Primary Examiner* — Hannah Pak (57) ABSTRACT

The instant invention provides a coating composition, a process of making a coating composition, a coated article, and a method of making such articles. The coating composition according to the present invention comprises: (a) a dispersion comprising; one or more base polymers; at least one first pigment partially encapsulated by said one or more base polymers, wherein said first pigment is a metal oxide selected from the group consisting of TiO2, SiO2, ZnO, Al2O3, combinations thereof; optionally one or more stabilizing agents; and a liquid media; and (b) optionally a binder composition.

10 Claims, 2 Drawing Sheets

(56) References Cited

U.S. PATENT DOCUMENTS

| | | | |
|---|---|---|---|
| 6,080,802 A | 6/2000 | Emmons | |
| 6,103,782 A * | 8/2000 | Mizobuchi et al. | 523/205 |
| 6,960,635 B2 | 11/2005 | Stevens et al. | |
| 2006/0009546 A1 | 1/2006 | Brown | |
| 2007/0116879 A1* | 5/2007 | Negri et al. | 427/355 |
| 2008/0017071 A1 | 1/2008 | Moebus | |
| 2008/0118728 A1* | 5/2008 | Magley et al. | 428/219 |

FOREIGN PATENT DOCUMENTS

| | | |
|---|---|---|
| WO | 9429888 | 12/1994 |
| WO | 0001745 | 1/2000 |
| WO | 2008018097 | 2/2008 |
| WO | 2008057878 | 5/2008 |

OTHER PUBLICATIONS

Instructions to Chinese associate for Response to Second Office Action for counterpart Chinese Patent Application No. 200980156787.8 dated Feb. 6, 2014.

Dow U.S. Appl. No. 11/376,835, Dow Technologies Inc., (Mar. 17, 2004).

PCT/US09/065446 International Search Report and Written Opinion, Dow Technologies Inc, (Nov. 3, 2010).

PCT/US09/065446 International Preliminary Report on Patentability, Dow Technologies Inc., (Jun. 30, 2011).

* cited by examiner

COATING COMPOSITION, A PROCESS OF PRODUCING A COATING COMPOSITION, A COATED ARTICLE, AND A METHOD OF MAKING SUCH ARTICLES

CROSS-REFERENCE TO RELATED APPLICATIONS

This application is a non-provisional application claiming priority from the U.S. Provisional Patent Application No. 61/122,921, filed on Dec. 16, 2008, entitled "COATING COMPOSITION, A PROCESS OF PRODUCING A COATING COMPOSITION, A COATED ARTICLE, AND A METHOD OF MAKING SUCH ARTICLES," the teachings of which are incorporated by reference herein, as if reproduced in full hereinbelow.

FIELD OF INVENTION

The instant invention relates to a coating composition, a process of making a coating composition, a coated article, and a method of making such articles.

BACKGROUND OF THE INVENTION

Coatings compositions comprising pigments are widely used in architectural, automotive, and industrial applications. Aqueous based pigmented coating compositions are complex formulations comprising a binder resin and a pigment dispersion, as well as other additives. The pigment dispersion is generally prepared by mixing pigment powder with a dispersant in water via a process that wets the pigment and disperses the pigment agglomerates into smaller particles, that is, pigment grind. However, as the pigment level is increased in the coating compositions, for example, paint formulations, the pigment particles may re-agglomerate. This re-agglomeration may cause the light scattering efficiency to be reduced, and it may also result in higher pigment loadings than would otherwise be required.

Since titanium dioxide is one of the main components in a paint formulation, the coatings industry has a continuing interest in reducing pigment agglomeration and improving pigment efficiency. A variety of different approaches have been utilized to reduce agglomeration, including optimization of pigment dispersant type used in the pigment grind, and treatment of $TiO_2$ particles to form a protective coating that sterically hinders crowding. However, there is still a need for a coating composition that provides improved light scattering properties such as improved opacity. Furthermore, there is still a need for a process to produce a coating composition that provides improved light scattering properties such as opacity.

SUMMARY OF THE INVENTION

The instant invention provides a coating composition, a process of making a coating composition, a coated article, and a method of making such articles.

In one embodiment, the present invention provides a coating composition comprising: (a) a dispersion comprising; one or more base polymers; at least one first pigment partially encapsulated by said one or more base polymers, wherein said first pigment is a metal oxide selected from the group consisting of $TiO_2$, $SiO_2$, ZnO, $Al_2O_3$, and combinations thereof; optionally one or more stabilizing agents; and a liquid media; and (b) optionally a binder composition.

In an alternative embodiment, the present invention provides a method for producing a coating composition comprising the steps of: (1) selecting at least one first pigment, wherein said first pigment is a metal oxide selected from the group consisting of $TiO_2$, $SiO_2$, ZnO, and $Al_2O_3$; (2) selecting one or more base polymers; (3) optionally selecting one or more stabilizing agents; (4) selecting a liquid media; (5) melt blending said first pigment and said one or more base polymers optionally in the presence of said one or more optional external stabilizing agents; (6) thereby at least partially encapsulating said first pigment with said one or more base polymers; (7) melt kneading said at least partially encapsulated first pigment in said liquid media optionally in the presence of said one or more optional external stabilizing agents; (8) thereby forming a dispersion; (9) optionally admixing said dispersion with a optional binder composition; and (10) thereby forming said coating composition.

In another alternative embodiment, the present invention provides a coated substrate comprising: a substrate; and a coating composition associated with said substrate, wherein said coating composition comprises: (a) a dispersion comprising: one or more base polymers; at least a first pigment partially encapsulated by said one or more base polymers, wherein said first pigment is a metal oxide selected from the group consisting of $TiO_2$, $SiO_2$, ZnO, and $Al_2O_3$; optionally one or more stabilizing agents; and a liquid media; and (b) optionally a binder composition.

In another alternative, the present invention provides a method of making a coated article comprising the steps of: (1) selecting a substrate; (2) selecting a coating composition comprising (a) a dispersion comprising: one or more base polymers; at least a first pigment partially encapsulated by said one or more base polymers, wherein said first pigment is a metal oxide selected from the group consisting of $TiO_2$, $SiO_2$, ZnO, and $Al_2O_3$; optionally one or more stabilizing agents; and a liquid media; and (b) optionally a binder composition; (3) applying said coating composition to said substrate; (4) optionally removing at least a portion of said liquid media; (5) thereby forming said coated article.

In another alternative embodiment, the present invention further provides a method for improving opacity of a coating composition comprising the steps of: (1) selecting a first pigment, wherein said first pigment is a metal oxide selected from the group consisting of $TiO_2$, $SiO_2$, ZnO, and $Al_2O_3$; (2) selecting one or more base polymers; (3) optionally selecting one or more external stabilizing agents; (4) selecting a liquid media; (5) melt blending said first pigment and said one or more base polymers optionally in the presence of said one or more optional stabilizing agents; (6) thereby at least partially encapsulating said first pigment with said one or more base polymers; (7) contacting said at least partially encapsulated first pigment with said liquid media optionally in the presence of said one or more optional external stabilizing agents; (8) thereby forming a dispersion; (9) optionally admixing said dispersion with an optional binder composition; and (10) thereby forming a coated composition having improved opacity.

BRIEF DESCRIPTION OF THE DRAWINGS

For the purpose of illustrating the invention, there is shown in the drawings a form that is exemplary; it being understood, however, that this invention is not limited to the precise arrangements and instrumentalities shown.

DETAILED DESCRIPTION OF THE INVENTION

The instant invention provides a coating composition, a process of making a coating composition, a coated article, and a method of making such articles.

The coating composition according to the present invention comprises (a) a dispersion, and (b) optionally a binder composition. The dispersion comprises one or more base polymers, at least one first pigment partially encapsulated by said one or more base polymers, wherein the first pigment is a metal oxide selected from the group consisting of $TiO_2$, $SiO_2$, ZnO, $Al_2O_3$, and combinations thereof; optionally one or more external stabilizing agents, for example, one or more external stabilizing agents; and a liquid media. The dispersion of the present invention may contain particles having an average particle size of from 0.01 to 5 microns, for example, 0.1 to 5 microns.

Base Polymer

The dispersion of the present invention comprises from 5 to 70 percent by weight of one or more base polymers, based on the total weight of the solid content of the dispersion. All individual values and subranges from 5 to 70 weight percent are included herein and disclosed herein; for example, the weight percent can be from a lower limit of 5, 8, 10, 15, 20, 25 weight percent to an upper limit of 40, 50, 60, or 70 weight percent. For example, the dispersion may comprise from 15 to 60, or in the alternative from 15 to 50, or in the alternative from 15 to 40 percent by weight of one or more base polymers, based on the total weight of the solid content of the dispersion. The dispersion comprises at least one or more base polymers. The base polymer may, for example, be selected from the group consisting of a thermoplastic material, and a thermoset material. The one or more base polymers comprise one or more olefin based polymers, one or more acrylic based polymers, one or more polyester based polymers, one or more solid epoxy polymers, one or more thermoplastic polyurethane polymers, one or more styrenic based polymers, and combinations thereof.

Examples of thermoplastic materials include, but are not limited to, homopolymers and copolymers (including elastomers) of an alpha-olefins such as ethylene, propylene, 1-butene, 3-methyl-1-butene, 4-methyl-1-pentene, 3-methyl-1-pentene, 1-heptene, 1-hexene, 1-octene, 1-decene, and 1-dodecene, as typically represented by polyethylene, polypropylene, poly-1-butene, poly-3-methyl-1-butene, poly-3-methyl-1-pentene, poly-4-methyl-1-pentene, ethylene-propylene copolymer, ethylene-1-butene copolymer, and propylene-1-butene copolymer; copolymers (including elastomers) of an alpha-olefin with a conjugated or non-conjugated diene, as typically represented by ethylene-butadiene copolymer and ethylene-ethylidene norbornene copolymer; and polyolefins (including elastomers) such as copolymers of two or more alpha-olefins with a conjugated or non-conjugated diene, as typically represented by ethylene-propylene-butadiene copolymer, ethylene-propylene -dicyclopentadiene copolymer, ethylene-propylene-1,5-hexadiene copolymer, and ethylene-propylene-ethylidene norbornene copolymer; ethylene-vinyl compound copolymers such as ethylene-vinyl acetate copolymer, ethylene-vinyl alcohol copolymer, ethylene-vinyl chloride copolymer, ethylene acrylic acid or ethylene-(meth)acrylic acid copolymers, and ethylene -(meth)acrylate copolymer; styrenic copolymers (including elastomers) such as polystyrene, ABS, acrylonitrile-styrene copolymer, α-methylstyrene-styrene copolymer, styrene vinyl alcohol, styrene acrylates such as styrene methylacrylate, styrene butyl acrylate, styrene butyl methacrylate, and styrene butadienes and crosslinked styrene polymers; and styrene block copolymers (including elastomers) such as styrene-butadiene copolymer and hydrate thereof, and styrene-isoprene-styrene triblock copolymer; polyvinyl compounds such as polyvinyl chloride, polyvinylidene chloride, vinyl chloride-vinylidene chloride copolymer, polymethyl acrylate, and polymethyl methacrylate; polyamides such as nylon 6, nylon 6,6, and nylon 12; thermoplastic polyesters such as polyethylene terephthalate and polybutylene terephthalate; polycarbonate, polyphenylene oxide, and the like; and glassy hydrocarbon-based resins, including poly-dicyclopentadiene polymers and related polymers (copolymers, terpolymers); saturated mono-olefins such as vinyl acetate, vinyl propionate, vinyl versatate, and vinyl butyrate and the like; vinyl esters such as esters of monocarboxylic acids, including methyl acrylate, ethyl acrylate, n-butyl acrylate, isobutyl acrylate, 2-ethylhexyl acrylate, dodecyl acrylate, n-octyl acrylate, phenyl acrylate, methyl methacrylate, ethyl methacrylate, and butyl methacrylate and the like; acrylonitrile, methacrylonitrile, acrylamide, mixtures thereof; resins produced by ring opening metathesis and cross metathesis polymerization and the like. These resins may be used either alone or in combinations of two or more.

Examples of suitable (meth)acrylates, as base polymers, include methyl acrylate, ethyl acrylate, butyl acrylate, hexyl acrylate, 2-ethylhexyl acrylate, octyl acrylate and isooctyl acrylate, n-decyl acrylate, isodecyl acrylate, tert-butyl acrylate, methyl methacrylate, butyl methacrylate, hexyl methacrylate, isobutyl methacrylate, isopropyl methacrylate as well as 2-hydroxyethyl acrylate and acrylamide. The preferred (meth)acrylates are methyl acrylate, ethyl acrylate, butyl acrylate, 2-ethylhexyl acrylate, octyl acrylate, isooctyl acrylate, methyl methacrylate and butyl methacrylate. Other suitable (meth)acrylates that can be polymerized from monomers include lower alkyl acrylates and methacrylates including acrylic and methacrylic ester monomers: methyl acrylate, ethyl acrylate, n-butyl acrylate, t-butyl acrylate, 2-ethylhexyl acrylate, decyl acrylate, isobornyl acrylate, methyl methacrylate, ethyl methacrylate, n-propyl methacrylate, isopropyl methacrylate, n-butyl methacrylate, isobutyl methacrylate, sec-butyl methacrylate, cyclohexyl methacrylate, isodecyl methacrylate, isobornyl methacrylate, t-butylaminoethyl methacrylate, stearyl methacrylate, glycidyl methacrylate, dicyclopentenyl methacrylate, phenyl methacrylate.

In selected embodiments, base polymer comprises a polyolefin selected from the group consisting of ethylene-alpha olefin copolymers, and propylene-alpha olefin copolymers. In particular, in select embodiments, the base polymer comprises one or more non-polar polyolefins.

In specific embodiments, polyolefins such as polypropylene, polyethylene, copolymers thereof, and blends thereof, as well as ethylene-propylene-diene terpolymers, may be used. In some embodiments, preferred olefinic polymers include homogeneous polymers, as described in U.S. Pat. No. 3,645,992 issued to Elston; high density polyethylene (HDPE), as described in U.S. Pat. No. 4,076,698 issued to Anderson; heterogeneously branched linear low density polyethylene (LLDPE); heterogeneously branched ultra low linear density polyethylene (ULDPE); homogeneously branched, linear ethylene/alpha-olefin copolymers; homogeneously branched, substantially linear ethylene/alpha-olefin polymers, which can be prepared, for example, by processes disclosed in U.S. Pat. Nos. 5,272,236 and 5,278,272, the disclosures of which are incorporated herein by reference; and high pressure, free radical polymerized ethylene polymers and copolymers such as low density polyethylene (LDPE) or ethylene vinyl acetate polymers (EVA).

In one embodiment, the base polymer is a propylene-based copolymer or interpolymer. In some particular embodiments, the propylene/ethylene copolymer or interpolymer is characterized as having substantially isotactic propylene sequences. The term "substantially isotactic propylene sequences" and similar terms mean that the sequences have an isotactic triad (mm) measured by 13C NMR of greater than about 0.85, preferably greater than about 0.90, more preferably greater than about 0.92 and most preferably greater than about 0.93. Isotactic triads are well-known in the art and are described in, for example, U.S. Pat. No. 5,504,172 and WO 00/01745, which refer to the isotactic sequence in terms of a triad unit in the copolymer molecular chain determined by 13C NMR spectra. Such propylene based copolymers are further described in details in the U.S. Pat. Nos. 6,960,635 and 6,525,157, incorporated herein by reference. Such propylene/alpha-olefin copolymers are commercially available from The Dow Chemical Company, under the tradename VERSIFY™, or from ExxonMobil Chemical Company, under the tradename VISTAMAXX™.

In other particular embodiments, the base polymer may be ethylene vinyl acetate (EVA) based polymers. In other embodiments, the base polymer may be ethylene-methyl acrylate (EMA) based polymers. In other particular embodiments, the ethylene-alpha olefin copolymer may be ethylene-butene, ethylene-hexene, or ethylene-octene copolymers or interpolymers. In other particular embodiments, the propylene-alpha olefin copolymer may be a propylene-ethylene or a propylene-ethylene-butene copolymer or interpolymer.

In certain embodiments, the base polymer may be a propylene-ethylene copolymer or interpolymer having an ethylene content between 5 and 20 percent by weight and a melt flow rate (230° C. with 2.16 kg weight) from 0.5 to 300 g/10 min. In other embodiments, the propylene-ethylene copolymer or interpolymer may have an ethylene content between 9 and 12 percent by weight and a melt flow rate (230° C. with 2.16 kg weight) from 1 to 100 g/10 min.

In other embodiments, the base polymer may have a crystallinity of less than 50 percent. In preferred embodiments, the crystallinity of the base polymer may be from 5 to 35 percent. In more preferred embodiments, the crystallinity may range from 7 to 20 percent.

In certain other embodiments, the base polymer is a semicrystalline polymer and may have a melting point of less than 110° C. In preferred embodiments, the melting point may be from 25 to 100° C. In more preferred embodiments, the melting point may be between 40 and 85° C.

In other selected embodiments, olefin block copolymers, for example, ethylene multi-block copolymer, such as those described in the U.S. patent application Ser. No. 11/376,835 may be used as the base polymer. Such olefin block copolymer may be an ethylene/α-olefin interpolymer:

(a) having a $M_w/M_n$ from 1.7 to 3.5, at least one melting point, $T_m$, in degrees Celsius, and a density, d, in grams/cubic centimeter, wherein the numerical values of $T_m$ and d corresponding to the relationship:

$$T_m > -2002.9 + 4538.5(d) - 2422.2(d)^2; \text{ or}$$

(b) having a $M_w/M_n$ from 1.7 to 3.5, and being characterized by a heat of fusion, ΔH in J/g, and a delta quantity, ΔT, in degrees Celsius defined as the temperature difference between the tallest DSC peak and the tallest CRYSTAF peak, wherein the numerical values of ΔT and ΔH having the following relationships:

$$\Delta T > -0.1299(\Delta H) + 62.81 \text{ for } \Delta H \text{ greater than zero and up to 130 J/g,}$$

$$\Delta T \geq 48° \text{ C. for } \Delta H \text{ greater than 130 J/g,}$$

wherein the CRYSTAF peak being determined using at least 5 percent of the cumulative polymer, and if less than 5 percent of the polymer having an identifiable CRYSTAF peak, then the CRYSTAF temperature being 30° C.; or (c) being characterized by an elastic recovery, Re, in percent at 300 percent strain and 1 cycle measured with a compression-molded film of the ethylene/α-olefin interpolymer, and having a density, d, in grams/cubic centimeter, wherein the numerical values of Re and d satisfying the following relationship when ethylene/α-olefin interpolymer being substantially free of a cross-linked phase:

$$Re > 1481 - 1629(d); \text{ or}$$

(d) having a molecular fraction which elutes between 40° C. and 130° C. when fractionated using TREF, characterized in that the fraction having a molar comonomer content of at least 5 percent higher than that of a comparable random ethylene interpolymer fraction eluting between the same temperatures, wherein said comparable random ethylene interpolymer having the same comonomer(s) and having a melt index, density, and molar comonomer content (based on the whole polymer) within 10 percent of that of the ethylene/α-olefin interpolymer; or (e) having a storage modulus at 25° C., G' (25° C.), and a storage modulus at 100° C., G' (100° C.), wherein the ratio of G' (25° C.) to G' (100° C.) being in the range of 1:1 to 9:1.

The ethylene/α-olefin interpolymer may also:

(a) have a molecular fraction which elutes between 40° C. and 130° C. when fractionated using TREF, characterized in that the fraction having a block index of at least 0.5 and up to about 1 and a molecular weight distribution, $M_w/M_n$, greater than about 1.3; or (b) have an average block index greater than zero and up to about 1.0 and a molecular weight distribution, $M_w/M_n$, greater than about 1.3.

In certain embodiments, the base polymer comprises a polar polymer, having a polar group as either a comonomer or grafted monomer. In exemplary embodiments, the base polymer comprises one or more polar polyolefins, having a polar group as either a comonomer or grafted monomer. Exemplary polar polyolefins include, but are not limited to, ethylene-acrylic acid (EAA) and ethylene-methacrylic acid copolymers, such as those available under the trademarks PRIMACOR™, commercially available from The Dow Chemical Company, NUCREL™, commercially available from E.I. DuPont de Nemours, and ESCOR™, commercially available from ExxonMobil Chemical Company and described in U.S. Pat. Nos. 4,599,392, 4,988,781, and 5,938,437, each of which is incorporated herein by reference in its entirety. Other exemplary base polymers include, but are not limited to, ethylene ethyl acrylate (EEA) copolymer, ethylene methyl methacrylate (EMMA), and ethylene butyl acrylate (EBA).

In one embodiment, the base polymer comprises a polar polyolefin selected from the group consisting of ethylene-acrylic acid (EAA) copolymer, ethylene-methacrylic acid copolymer, and combinations thereof, and the stabilizing agent comprises a polar polyolefin selected from the group consisting of ethylene-acrylic acid (EAA) copolymer, ethylene-methacrylic acid copolymer, and combinations thereof; provided, however, that base polymer has a lower acid number, measured according to D-974, that the stabilizing agent.

In certain embodiments, the base polymer may, for example, comprise a thermoset material comprising an epoxy resin. Epoxy resin refers to a composition which possesses one or more vicinal epoxy groups per molecule, that is, at least one 1,2-epoxy group per molecule. In general, such compound is a saturated or unsaturated aliphatic, cycloaliphatic, aromatic or heterocyclic compound which possesses at least one 1,2-epoxy group. Such compound can be substituted, if desired, with one or more non-interfering substituents, such as halogen atoms, hydroxy groups, ether radicals, lower alkyls and the like.

Illustrative epoxies are described in the *Handbook of Epoxy Resins* by H. E. Lee and K. Neville published in 1967 by McGraw-Hill, New York and U.S. Pat. No. 4,066,628, incorporated herein by reference.

Particularly useful compounds which can be used in the practice of the present invention are epoxy resins having the following formula:

wherein n has an average value of 0 or more.

The epoxy resins useful in the present invention may include, for example, the glycidyl polyethers of polyhydric phenols and polyhydric alcohols. As an illustration of the present invention, examples of known epoxy resins that may be used in the present invention, include for example, the diglycidyl ethers of resorcinol, catechol, hydroquinone, bisphenol, bisphenol A, bisphenol AP (1,1-bis(4-hydroxy-lphenyl)-1-phenyl ethane), bisphenol F, bisphenol K, tetrabromobisphenol A, phenol-formaldehyde novolac resins, alkyl substituted phenol-formaldehyde resins, phenol-hydroxybenzaldehyde resins, cresol-hydroxybenzaldehyde resins, dicyclopentadiene -phenol resins, dicyclopentadiene-substituted phenol resins tetramethylbiphenol, tetramethyl-tetrabromobiphenol, tetramethyltribromobiphenol, tetrachlorobisphenol A and any combination thereof.

Examples of diepoxides particularly useful in the present invention include diglycidyl ether of 2,2-bis(4-hydroxyphenyl)propane (generally referred to as bisphenol A) and diglycidyl ether of 2,2-bis(3,5-dibromo-4-hydroxyphenyl)propane (generally referred to as tetrabromobisphenol A). Mixtures of any two or more polyepoxides can also be used in the practice of the present invention.

Other diepoxides which can be employed in the practice of the present invention include the diglycidyl ethers of dihydric phenols, such as those described in U.S. Pat. Nos. 5,246,751; 5,115,075; 5,089,588; 4,480,082 and 4,438,254, all of which are incorporated herein by reference, or the diglycidyl esters of dicarboxylic acids such as those described in U.S. Pat. No. 5,171,820. Other suitable diepoxides include for example, αω-diglycidyloxyisopropylidene-bisphenol-based epoxy resins (commercially known as D.E.R.® 300 and 600 series epoxy resins, products of The Dow Chemical Company, Midland, Mich.).

The epoxy resins which can be employed in the practice of the present invention also include epoxy resins prepared either by reaction of diglycidyl ethers of dihydric phenols with dihydric phenols or by reaction of dihydric phenols with epichlorohydrin (also known as "taffy resins").

Exemplary epoxy resins include, for example, the diglycidyl ethers of bisphenol A; 4,4'-sulfonyldiphenol; 4,4-oxy-diphenol; 4,4'-dihydroxybenzophenone; resorcinol; hydroquinone; 9,9'-bis(4-hydroxyphenyl)fluorene; 4,4'-dihydroxybiphenyl or 4,4'-dihydroxy-α-methylstilbene and the diglycidyl esters of the dicarboxylic acids.

Other useful epoxide compounds which can be used in the practice of the present invention are cycloaliphatic epoxides. A cycloaliphatic epoxide consists of a saturated carbon ring having an epoxy oxygen bonded to two vicinal atoms in the carbon ring for example as illustrated by the following general formula:

wherein R is a hydrocarbon group optionally comprising one or more heteroatoms (such as, without limitation thereto Cl, Br, and S), or an atom or group of atoms forming a stable bond with carbon (such as, without limitation thereto, Si, P and B) and wherein n is greater than or equal to 1.

The cycloaliphatic epoxide may be a monoepoxide, a diepoxide, a polyepoxide, or a mixture of those. For example, any of the cycloaliphatic epoxide described in U.S. Pat. No. 3,686,359, incorporated herein by reference, may be used in the present invention. As an illustration, the cycloaliphatic epoxides that may be used in the present invention include, for example, (3,4-epoxycyclohexyl-methyl)-3,4-epoxy-cyclohexane carboxylate, bis-(3,4-epoxycyclohexyl)adipate, vinylcyclohexene monoxide and mixtures thereof.

In certain embodiments, the base polymer comprises a thermoplastic polyurethane polymer. Such thermoplastic polyurethane polymers are generally know, and further described, for example, in the International Publication No. 2008/057878, incorporated herein by reference to the extent that it describes a thermoplastic polyurethane polymer.

Those having ordinary skill in the art will recognize that the above list is a non-comprehensive listing of exemplary base polymers. It will be appreciated that the scope of the present invention is restricted by the claims only.

First Pigment

The dispersion of the present invention comprises one or more first pigments. One or more first pigments may, for example, be a metal oxide. For example, one or more first pigments may be a metal oxide selected from the group consisting of $TiO_2$, $SiO_2$, ZnO, $Al_2O_3$, and combinations thereof. In an alternative, one or more first pigments may be $TiO_2$ in either rutile form or anatase form. The dispersion of the instant invention comprises 15 to 95 percent by weight of one or more first pigments, based on the total weight of the solid content of the dispersion. All individual values and subranges from 15 to 95 weight percent are included herein and disclosed herein; for example, the weight percent can be from a lower limit of 15, 20, 25, 30, 40, or 50 weight percent to an upper limit of 65, 75, 80, 85, 90, or 95 weight percent. For example, the dispersion may comprise from 20 to 95, or in the alternative, the dispersion may comprise from 20 to 85, or in the alternative from 30 to 85, or in the alternative from 40 to 85, or in the alternative from 50 to 85 percent by weight of one or more first pigments, based on the total weight of the solid content of the dispersion. The one or more first pigments may have an average particle size diameter in the range of from 0.1 to 1 μm. All individual values and subranges from 0.1 to 1 μm are included herein and disclosed herein; for example, the average particle size diameter can be from a lower limit of 0.1, 0.15, or 0.2 μm to an upper limit of 0.3, 0.4, 0.5, 0.6, 0.7 0.8, 0.9, or 1 μm. For example, the one or more first pigments may have an average particle size diameter in the range of from 0.1 to 0.7 μm, or in the alternative 0.1 to 0.5 μm, or in the alternative 0.1 to 0.4 μm, or in the alternative 0.2 to 0.5 μm, or in the alternative 0.2 to 0.4 μm, or in the alternative 0.2 to 0.6 μm, or in the alternative 0.3 to 0.5 μm. The one or more first pigments may have a refractive index in the range of from less than 3; for example, the refractive index is in the range of 1 to 2.8. The one or more first pigments may be surface treated with inorganic materials, for example, silica, alumina, or organic materials, for example, polyol based treatment agents, fatty acids; or groups with combined organic and inorganic functionality, for example, organo silanes, organo phosphates, organo titanates, organo zirconates, so that the one or more first pigments are exhibiting optimum properties.

Stabilizing Agent

The dispersion according to the present invention may further comprise at least one or more stabilizing agents, also referred to herein as dispersion agents, to promote the formation of a stable dispersion. The stabilizing agent may preferably be an external stabilizing agent. The dispersion of the instant invention comprises 1 to 50 percent by weight of one or more stabilizing agents, based on the total weight of the solid content of the dispersion. All individual values and subranges from 1 to 45 weight percent are included herein and disclosed herein; for example, the weight percent can be from a lower limit of 1, 3, 5, 10 weight percent to an upper limit of 15, 25, 35, or 45 weight percent. For example, the dispersion may comprise from 1 to 25, or in the alternative from 1 to 35, or in the alternative from 1 to 40, or in the alternative from 1 to 45 percent by weight of one or more stabilizing agents, based on the total weight of the solid content of the dispersion. In selected embodiments, the stabilizing agent may be a surfactant, a polymer, or mixtures thereof. In certain embodiments, the stabilizing agent can be a polar polymer, having a polar group as either a comonomer or grafted monomer. In exemplary embodiments, the stabilizing agent comprises one or more polar polyolefins, having a polar group as either a comonomer or grafted monomer. Exemplary polymeric stabilizing agents include, but are not limited to, ethylene-acrylic acid (EAA) and ethylene-methacrylic acid copolymers, such as those available under the trademarks PRIMACOR™, commercially available from The Dow Chemical Company, NUCREL™, commercially available from E.I. DuPont de Nemours, and ESCOR™, commercially available from ExxonMobil Chemical Company and described in U.S. Pat. Nos. 4,599,392, 4,988,781, and 5,938,437, each of which is incorporated herein by reference in its entirety. Other exemplary polymeric stabilizing agents include, but are not limited to, ethylene ethyl acrylate (EEA) copolymer, ethylene methyl methacrylate (EMMA), and ethylene butyl acrylate (EBA). Other ethylene-carboxylic acid copolymer may also be used. Those having ordinary skill in the art will recognize that a number of other useful polymers may also be used.

Other stabilizing agents that may be used include, but are not limited to, long chain fatty acids, fatty acid salts, or fatty acid alkyl esters having from 12 to 60 carbon atoms. In other embodiments, the long chain fatty acid or fatty acid salt may have from 12 to 40 carbon atoms.

The stabilizing agent may be partially or fully neutralized with a neutralizing agent. In certain embodiments, neutralization of the stabilizing agent, such as a long chain fatty acid or EAA, may be from 25 to 200 percent on a molar basis; or in the alternative, it may be from 50 to 110 percent on a molar basis. For example, for EAA, the neutralizing agent may be a base, such as ammonium hydroxide or potassium hydroxide, for example. Other neutralizing agents can include lithium hydroxide or sodium hydroxide, for example. In another alternative, the neutralizing agent may, for example, be a carbonate. In another alternative, the neutralizing agent may, for example, be any amine such as monoethanolamine, or 2-amino-2-methyl-1-propanol (AMP). Amines useful in embodiments disclosed herein may include monoethanolamine, diethanolamine, triethanolamine, and TRIS AMINO (each available from Angus), NEUTROL TE (available from BASF), as well as triisopropanolamine, diisopropanolamine, and N,N-dimethylethanolamine (each available from The Dow Chemical Company, Midland, Mich.). Other useful amines may include ammonia, monomethylamine, dimethylamine, trimethylamine, monoethylamine, diethylamine, triethylamine, mono-n-propylamine, dimethyl-n propylamine, N-methanol amine, N-aminoethylethanolamine, N -methyldiethanolamine, monoisopropanolamine, N,N-dimethyl propanolamine, 2-amino-2-methyl-1-propanol, tris(hydroxymethyl)-aminomethane, N,N,N'N'-tetrakis(2-hydroxylpropyl)ethylenediamine. In some embodiments, mixtures of amines or mixtures of amines and surfactants may be used. Those having ordinary skill in the art will appreciate that the selection of an appropriate neutralizing agent depends on the specific composition formulated, and that such a choice is within the knowledge of those of ordinary skill in the art.

Additional stabilizing agents that may be useful in the practice of the present invention include, but are not limited to, cationic surfactants, anionic surfactants, or non-ionic surfactants. Examples of anionic surfactants include, but are not limited to, sulfonates, carboxylates, and phosphates. Examples of cationic surfactants include, but are not limited to, quaternary amines. Examples of non-ionic surfactants include, but are not limited to, block copolymers containing ethylene oxide and silicone surfactants. Stabilizing agents useful in the practice of the present invention can be either external surfactants or internal surfactants. External surfactants are surfactants that do not become chemically reacted into the base polymer during dispersion preparation. Examples of external surfactants useful herein include, but are not limited to, salts of dodecyl benzene sulfonic acid and lauryl sulfonic acid salt. Internal surfactants are surfactants that do become chemically reacted into the base polymer during dispersion preparation. An example of an internal surfactant useful herein includes 2,2-dimethylol propionic acid and its salts. Additional surfactants that may be useful in the practice of the present invention include cationic surfactants, anionic surfactants, non-ionic surfactants, or combinations thereof. Various commercially available surfactants may be used in embodiments disclosed herein, including: OP-100 (a sodium stearate), OPK-1000 (a potassium stearate), and OPK-181 (a potassium oleate), each available from RTD Hallstar; UNICID 350, available from Baker Petrolite; DISPONIL FES 77-IS and DISPONIL TA-430, each available from Cognis; RHODAPEX CO-436, SOPROPHOR 4D384, 3D-33, and 796/P, RHODACAL BX-78 and LDS-22, RHODAFAC RE-610, and RM-710, and SUPRAGIL MNS/90, each available from Rhodia; and TRITON QS-15, TRITON W-30, DOWFAX 2A1, DOWFAX 3B2, DOWFAX 8390, DOWFAX C6L, TRITON X-200, TRITON XN-45S, TRITON H-55, TRITON GR-5M, TRITON BG-10, and TRITON CG-110, each available from The Dow Chemical Company, Midland, Mich.

Fluid Medium

The dispersion further comprises a fluid medium. The fluid medium may be any medium; for example, the fluid medium may be water. The dispersion of the instant invention comprises 35 to 75 percent by volume of fluid medium, based on the total volume of the dispersion. In particular embodiments, the water content may be in the range of from 35 to 70, or in the alternative from 35 to 65, or in the alternative from 45 to 55 percent by volume, based on the total volume of the dispersion. Water content of the dispersion may preferably be controlled so that the solids content (base polymer plus stabilizing agent) is between 1 percent to 74 percent by volume. In particular embodiments, the solids range may be between 10 percent to 70 percent by volume. In other particular embodiments, the solids range is between 20 percent to 60 percent by volume. In certain other embodiments, the solids range is between 30 percent to 55 percent by volume.

Additional Components for Coating Composition

The coating composition may further comprise a binder composition. Binder compositions for coating compositions are generally known, and exemplary binder compositions, for example, include but are not limited to acrylic latex, vinyl acrylic latex, styrene acrylic latex, vinyl acetate ethylene latex, and combinations thereof.

The coating composition may further comprise optionally one or more fillers, optionally one or more additives, optionally one or more second pigments, for example, titanium dioxide, mica, calcium carbonate, silica, zinc oxide, milled glass, aluminum trihydrate, talc, antimony trioxide, fly ash, and clay; optionally one or more co-solvents, for example, glycols, glycol ether, 2,2,4-trimethyl-1,3-pentanediol monoisobutyrate, alcohols, mineral spirits, and benzoate esters; optionally one or more dispersants, for example, aminoalcohols, and polycarboxylates; optionally one or more surfactants; optionally one or more defoamers; optionally one or more preservatives, for example, biocides, mildewcides, fungicides, algaecides, and combinations thereof; optionally one or more thickeners, for example, cellulosic based thickeners such as hydroxyethyl cellulose, hydrophobically modified alkali soluble emulsions (HASE thickeners such as UCAR POLYPHOBE TR-116) and hydroobically modified ethoxylated urethane thickeners (HEUR); or optionally one or more second neutralizing agents, for example, hydroxides, amines, ammonia, and carbonates.

Forming the Dispersion

The dispersion can be formed by any number of methods recognized by those having skill in the art. In one embodiment, one or more base polymers, one or more first pigments, and optionally one or more stabilizing agents are melt-kneaded in an extruder along with water and a neutralizing agent, such as ammonia, potassium hydroxide, or a combination of the two to form a dispersion compound. In another embodiment, one or more base polymers and one or more first pigments are compounded, and then the compound is melt-kneaded in an extruder in the presence of an optional stabilizing agent, water, and one or more first neutralizing agents. In some embodiments, the dispersion is first diluted to contain 1 to 3 percent by weight water and then, subsequently, further diluted to comprise greater than about 25 percent by weight water.

Any melt-kneading means known in the art may be used. In some embodiments, a kneader, a BANBURY® mixer, single-screw extruder, or a multi-screw extruder, for example, a twin screw extruder, is used. A process for producing the dispersions in accordance with the present invention is not particularly limited. For example, an extruder, in certain embodiments a twin screw extruder, is coupled to a back pressure regulator, melt pump, or gear pump. Exemplary embodiments also provide a base reservoir and an initial water reservoir, each of which includes a pump. Desired amounts of base and initial water are provided from the base reservoir and the initial water reservoir, respectively. Any suitable pump may be used, but in some embodiments a pump that provides a flow of about 150 cc/min at a pressure of 240 bar is used to provide the base and the initial water to the extruder. In other embodiments, a liquid injection pump provides a flow of 300 cc/min at 200 bar or 600 cc/min at 133 bar. In some embodiments, the base and initial water are preheated in a preheater.

One or more base polymers, in the form of pellets, powder, or flakes, are fed from the feeder to an inlet of the extruder where the resin is melted or compounded. One or more first pigments may be fed simultaneously with one or more base polymers into the extruder via the feeder; or in the alternative, one or more first pigments may be compounded into one or more base polymers, and then fed into the extruder via the feeder. In the alternative, additional one or more first pigments may further be metered via an inlet prior to the emulsification zone into the molten compound comprising one or more base polymers and optionally one or more first pigments. In some embodiments, the dispersing agent is added to one or more base polymers through and along with the resin and in other embodiments, the dispersing agent is provided separately to the twin screw extruder. The resin melt is then delivered from the mix and convey zone to an emulsification zone of the extruder where the initial amount of water and base from the water and base reservoirs are added through an inlet. In some embodiments, dispersing agent may be added additionally or exclusively to the water stream. In some embodiments, further dilution water may be added via water inlet from water reservoir in a dilution and cooling zone of the extruder. Typically, the dispersion is diluted to at least 30 weight percent water in the cooling zone. In addition, the diluted mixture may be diluted any number of times until the desired dilution level is achieved. In some embodiments, water is not added into the twin screw extruder but rather to a stream containing the resin melt after the melt has exited from the extruder. In this manner, steam pressure build-up in the extruder is eliminated.

In one embodiment, the present invention provides a method for producing a coating composition comprising the steps of: (1) selecting at least one first pigment, wherein said first pigment is a metal oxide selected from the group consisting of $TiO_2$, $SiO_2$, $ZnO$, and $Al_2O_3$; (2) selecting one or more base polymers; (3) optionally selecting one or more external stabilizing agents; (4) selecting a liquid media; (5) melt blending said first pigment and said one or more base polymers optionally in the presence of said one or more optional external stabilizing agents; (6) thereby at least partially encapsulating said first pigment with said one or more base polymers; (7) contacting said at least partially encapsulated first pigment with said liquid media optionally in the presence of said one or more optional external stabilizing agents; (8) thereby forming a dispersion; (9) optionally admixing said dispersion with a optional binder composition; and (10) thereby forming said coating composition.

In one embodiment, the present invention further provides a method for improving opacity of a coating composition comprising the steps of: (1) selecting a first pigment, wherein said first pigment is a metal oxide selected from the group consisting of $TiO_2$, $SiO_2$, $ZnO$, and $Al_2O_3$; (2) selecting one or more base polymers; (3) optionally selecting one or more external stabilizing agents; (4) selecting a liquid media; (5) melt blending said first pigment and said one or more base polymers optionally in the presence of said one or more optional external stabilizing agents; (6) thereby at least partially encapsulating said first pigment with said one or more base polymers; (7) contacting said at least partially encapsulated first pigment with said liquid media optionally in the presence of said one or more optional external stabilizing agents; (8) thereby forming a dispersion; (9) optionally admixing said dispersion with an optional binder composition; and (10) thereby forming a coated composition having improved opacity.

End-Use Applications

The coating composition of the present invention may be used, for example, in architectural coating applications, automotive coating applications, and industrial coating applications.

In one embodiment, the present invention provides a coated substrate comprising: a substrate; and a coating composition associated with said substrate, wherein said coating composition comprises: (a) a dispersion comprising: one or more base polymers; at least a first pigment partially encapsulated by said one or more base polymers, wherein said first pigment is a metal oxide selected from the group consisting of $TiO_2$, $SiO_2$, ZnO, and $Al_2O_3$; optionally one or more external stabilizing agents; and a liquid media; and (b) optionally a binder composition.

In another alternative, the present invention provides a method of making a coated article comprising the steps of: (1) selecting a substrate; (2) selecting a coating composition comprising (a) a dispersion comprising: one or more base polymers; at least a first pigment partially encapsulated by said one or more base polymers, wherein said first pigment is a metal oxide selected from the group consisting of $TiO_2$, $SiO_2$, ZnO, and $Al_2O_3$; optionally one or more external stabilizing agents; and a liquid media; and (b) optionally a binder composition; (3) applying said coating composition to said substrate; (4) optionally removing at least a portion of said liquid media; (5) thereby forming said coated article.

EXAMPLES

The following examples illustrate the present invention but are not intended to limit the scope of the invention.

Inventive Dispersion Samples 1-3

Inventive dispersion sample 1-3 were prepared according to the following process.

Inventive Dispersion Sample 1

Aqueous dispersions of $TiO_2$ encapsulated by AFFINITY GA 1900, an ethylene/octene copolymer having a density of approximately 0.87 g/cm³, available from The Dow Chemical Company, were prepared via an extruder where 50 g/min of AFFINITY GA 1900 resin, 116 g/min of $TiO_2$ (TI-PURE R-902plus, available from DuPont Corporation) and 6 g/min of the surfactant Pluronic F-108, available from BASF, were fed into a twin screw extruder to melt the resin and surfactant and incorporate the $TiO_2$. The resin/$TiO_2$/surfactant melt blend was forwarded and combined with 8.8 ml/min water and 6.4 g/min of the surfactant DOWFAX 2A1, available from The Dow Chemical Company. The resulting aqueous dispersion was forwarded within the extruder to the dilution zone where additional water was added to adjust the solids level to 56.1 weight percent. The product was cooled, and exited out of the extruder into a collection vessel. The resulting product had a volume mean particle size of 0.46 microns. A summary of the dispersion components is reported in Table 1. The tested properties of the inventive dispersions are reported in Table II.

Inventive Dispersion Sample 2

Aqueous dispersions of $TiO_2$ encapsulated with PRIMACOR ethylene acrylic acid copolymer were prepared via an extruder where 50 g/min of PRIMACOR 5980i, available from The Dow Chemical Company, and 118 g/min of $TiO_2$ (TI-PURE R-902plus, available for DuPont Corporation) were fed into a twin screw extruder to melt the resin and incorporate the $TiO_2$. The resin/$TiO_2$ melt blend was forwarded and combined with 16 ml/min water containing 7 g/min of potassium hydroxide. The resulting aqueous dispersion was forwarded within the extruder to the dilution zone where additional water was added to adjust the solids level to 48.9 weight percent. The product was cooled and exited out of the extruder into a collection vessel. The resulting product had a volume mean particle size of 0.48 microns. A summary of the dispersion components is reported in Table 1. The tested properties of the inventive dispersions are reported in Table II.

Inventive Dispersion Sample 3

Aqueous dispersions of $TiO_2$ encapsulated with polyester resin were prepared via an extruder where 29 g/min of FINETONE T-382-ES, available from Reichhold Chemical Company, and 24 g/min of $TiO_2$ (TI-PURE R-902plus, available from DuPont Corporation) were fed into a twin screw extruder to melt the resin and incorporate the $TiO_2$. The resin/$TiO_2$ melt blend was forwarded and combined with 13.5 ml/min water containing 1 g/min of triethanolamine. The resulting aqueous dispersion was forwarded within the extruder to the dilution zone where additional water was added to adjust the solids level to 38.7 weight percent. The product was cooled and exited the extruder into a collection vessel. The resulting product had a volume mean particle size of 0.58 microns. A summary of the dispersion components is reported in Table 1. The tested properties of the inventive dispersions are reported in Table II.

TABLE I

|  | Inventive Dispersion Sample 1 | Inventive Dispersion Sample 2 | Inventive Dispersio$$ Sample 3 |
|---|---|---|---|
| Formulation (Weight %) |  |  |  |
| AFFINITY GA 1900 | 28.0 | — | — |
| PRIMACOR 5980i | — | 28.5 | — |
| FINETONE T-382-ES | — | — | 54.0 |
| TI-PURE R-902+ | 65.0 | 67.5 | 44.1 |
| KOH (actives) | — | 4.0 | — |
| TEA (actives) tri-ethanol amine | — | — | 1.9 |
| DOWFAX 2A1 (actives) | 3.6 | — | — |
| PLURONIC F108 | 3.4 | — | — |
| Totals (wt. %) | 100.0 | 100.0 | 100.0 |
| Formulation (Volume %) |  |  |  |
| AFFINITY GA 1900 | 58.3 | — | — |
| PRIMACOR 5980i | — | 61.3 | — |
| FINETONE T-382-ES | — | — | 78.0 |
| TI-PURE R-902+ | 29.4 | 34.7 | 19.1 |
| KOH (actives) | — | 4.0 | — |
| TEA (actives) tri-ethanol amine | — | — | 2.9 |
| DOWFAX 2A1 (actives) | 6.5 | — | — |
| PLURONIC F108 | 5.8 | — | — |
| Totals (vol. %) | 100.0 | 100.0 | 100.0 |
| Resin Neutralization, % | — | 90 | 62 |

TABLE II

|  | Inventive Dispersion Sample 1 | Inventive Dispersion Sample 2 | Inventive Dispersion Sample 3 |
|---|---|---|---|
| Particle Size, μm | 0.46 | 0.48 | 0.58 |
| Polydispersity, Dv/Dn | 4.3 | 1.2 | 5.5 |
| Mode, μm | 0.36 | 0.47 | 0.30 |
| pH of dispersion | 8.0 | 10.7 | 7.6 |
| Measured Solids, wt. % | 56.1 | 48.9 | 38.7 |
| Inorganics (TGA), wt % | 65.0 | 71.5 | — |

Inventive Coating Compositions 1-8

Figure 1:
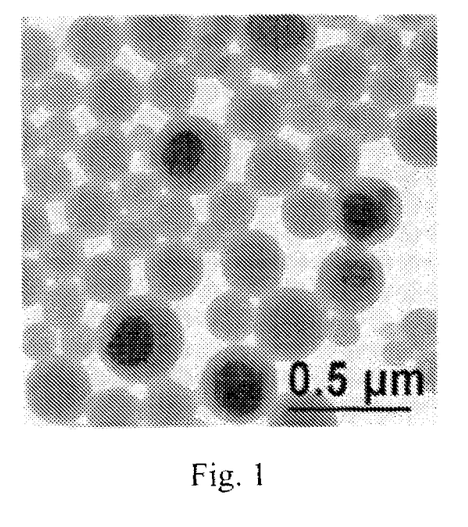
FIG. 1 is a TEM picture of one exemplary inventive dispersion.
Figure 2:
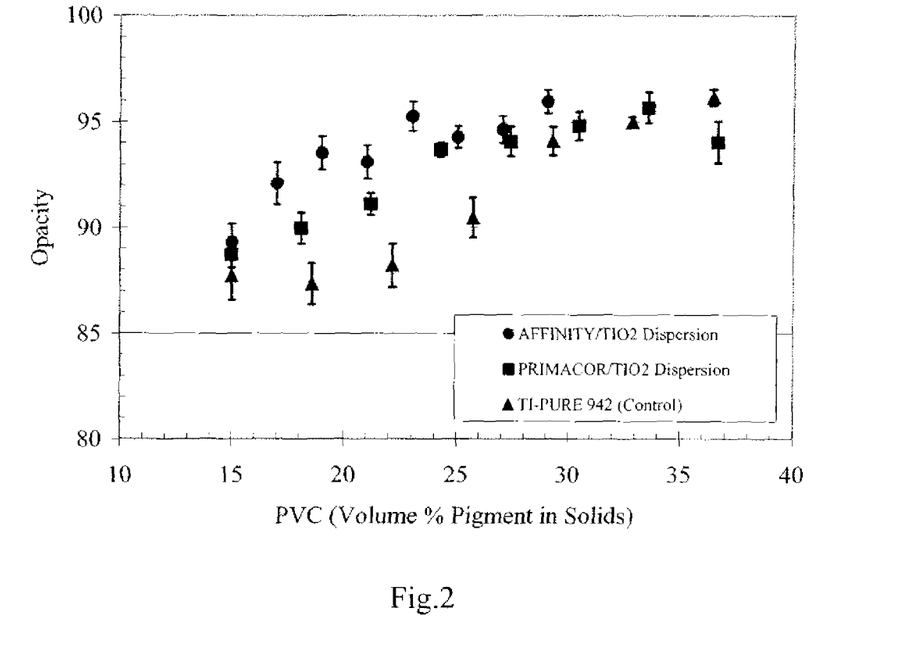
FIG. 2 is plot illustrating the relationship between opacity properties and pigment volume concentration (PVC).

Inventive coating compositions 1-8 were prepared utilizing inventive dispersion sample 1, as described hereinabove, according to the following process. Initial masterbatch solutions consisting of an initial grind step where the inventive dispersion sample 1, a UCAR POLYPHOBE TR-116 thickener, water and base were added and mixed for 10 minutes at 1500 RPM with a Cowles blade. Additional latex and water was then added during mixing with a propeller type blade at 400 RPM. The masterbatch solutions were blended to obtain the desired range of pigment concentrations resulting in the final formulations listed in Table III. The formulation components of inventive coating compositions 1-8 are reported in Table III. The opacity properties of the inventive compositions 1-8 were also tested, and further reported in Table III, and FIG. 2.

TABLE III

| | Mass of component (g) | | | | | | |
|---|---|---|---|---|---|---|---|
| | POLYPHOBE TR116 (thickener) | Inventive Dispersion Sample 1 | water | AMP-95 (base) | UCAR Latex 625 (wet weight, acrylic latex) | Pigment Volume Concentration (PVC*) | Opacity (%) |
| Inventive Coating Comp. 1 | 0.047 | 2.646 | 3.507 | 0.007 | 0.793 | 15.0 | 89.3 |
| Inventive Coating Comp. 2 | 0.047 | 2.943 | 3.324 | 0.007 | 0.680 | 17.0 | 92.1 |
| Inventive Coating Comp. 3 | 0.046 | 3.240 | 3.140 | 0.007 | 0.567 | 19.0 | 93.5 |
| Inventive Coating Comp. 4 | 0.046 | 3.537 | 2.957 | 0.007 | 0.453 | 21.0 | 93.1 |
| Inventive Coating Comp. 5 | 0.046 | 3.834 | 2.773 | 0.007 | 0.340 | 23.0 | 95.3 |
| Inventive Coating Comp. 6 | 0.046 | 4.131 | 2.590 | 0.007 | 0.227 | 25.0 | 94.3 |
| Inventive Coating Comp. 7 | 0.046 | 4.428 | 2.406 | 0.007 | 0.113 | 27.0 | 94.6 |
| Inventive Coating Comp. 8 | 0.046 | 4.725 | 2.223 | 0.007 | 0.000 | 29.0 | 95.9 |

*PVC = Volume of $TiO_2$/(Total Volume of Solids) * 100

Inventive Coating Compositions 9-16

Inventive coating compositions 9-16 were prepared using inventive dispersion sample 2 without any stabilizing agent according to the following process. Initial masterbatch solutions consisting of an initial grind step where the inventive dispersion sample 1, CELLOSIZE QP 4400H HEC thickener, water and base (AMP-95) were added and mixed for 10 minutes at 1500 RPM with a Cowles blade. Additional latex and water was then added during mixing with a propeller type blade at 400 RPM. The masterbatch solutions were blended to obtain the desired range of pigment concentrations resulting in the final formulations listed in Table IV. The formulation components of inventive coating compositions 9-16 are reported in Table IV. The opacity properties of the inventive compositions 9-16 were also tested, and further reported in Table IV, and FIG. 2.

Comparative Coating Compositions 1-7

Comparative coating compositions 1-7 were prepared according to the following process. Comparative coating compositions 1-7 were prepared by first formulating a set of masterbatches. Initial masterbatch solutions consisted of an initial grind step where the TI-PURE R-942 $TiO_2$ dispersion, commercially available from Du Pont Corporation, CELLOSIZE QP 4400H HEC thickener, water and a base (AMP-95) were added and mixed for 10 minutes at 1500 RPM with a Cowles blade. Additional latex and water were then added during mixing with a propeller type blade at 400 RPM. The masterbatch solutions were blended to obtain the desired range of pigment concentrations resulting in the final formulations listed in Table V. The formulation components of comparative coating compositions 1-7 are reported in Table V. The opacity properties of the comparative compositions 1-7 were also tested, and further reported in Table V, and FIG. 2.

TABLE IV

| | Mass of component (g) | | | | | | |
|---|---|---|---|---|---|---|---|
| | Inventive Dispersion Sample 2 | 3% HEC solution (hydroxyethyl cellulose in water, as thickener) | water | AMP-95 (base) | UCAR 625 (wet weight, latex) | Pigment Volume Concentration (PVC*) | Opacity (%) |
| Inventive Coating Composition 9 | 2.742 | 1.241 | 2.007 | 0.007 | 1.004 | 15.0 | 88.7 |
| Inventive Coating Composition 10 | 3.193 | 1.220 | 1.720 | 0.007 | 0.860 | 18.1 | 90.0 |
| Inventive Coating Composition 11 | 3.643 | 1.200 | 1.433 | 0.007 | 0.717 | 21.2 | 91.1 |
| Inventive Coating Composition 12 | 4.094 | 1.179 | 1.147 | 0.007 | 0.573 | 24.3 | 93.7 |
| Inventive Coating Composition 13 | 4.545 | 1.158 | 0.860 | 0.007 | 0.430 | 27.4 | 94.1 |
| Inventive Coating Composition 14 | 4.996 | 1.137 | 0.573 | 0.007 | 0.287 | 30.5 | 94.8 |
| Inventive Coating Composition 15 | 5.446 | 1.117 | 0.287 | 0.007 | 0.143 | 33.5 | 95.7 |
| Inventive Coating Composition 16 | 5.897 | 1.096 | 0.000 | 0.007 | 0.000 | 36.6 | 94.0 |

*PVC = Volume of $TiO_2$/(Total Volume of Solid) * 100

TABLE V

| | Mass of component (g) | | | | | Pigment Volume Concentration (PVC) | Opacity (%) |
| --- | --- | --- | --- | --- | --- | --- | --- |
| | 3% HEC solution | TI-PURE R942 | water | AMP-95 | UCAR Latex 625 (wet weight, acrylic latex) | | |
| Comparative Coating Composition 1 | 1.232 | 1.242 | 3.092 | 0.007 | 1.427 | 15.0 | 87.7 |
| Comparative Coating Composition 2 | 1.207 | 1.471 | 2.970 | 0.007 | 1.345 | 18.6 | 87.3 |
| Comparative Coating Composition 3 | 1.182 | 1.700 | 2.848 | 0.007 | 1.264 | 22.1 | 88.2 |
| Comparative Coating Composition 4 | 1.157 | 1.928 | 2.725 | 0.007 | 1.182 | 25.7 | 90.5 |
| Comparative Coating Composition 5 | 1.132 | 2.157 | 2.603 | 0.007 | 1.100 | 29.3 | 94.1 |
| Comparative Coating Composition 6 | 1.107 | 2.386 | 2.481 | 0.007 | 1.018 | 32.8 | 95.0 |
| Comparative Coating Composition 7 | 1.083 | 2.615 | 2.359 | 0.007 | 0.937 | 36.4 | 96.1 |

Test Methods

Test methods include the following:
Particle sizes are measured on a Beckman-Coulter LS230 laser-diffraction particle size analyzer.

Opacity was measured on a coating prepared on a black and white panel using a 2" wide adjustable gap drawdown bar with a gap set to 4 mils. Samples were dried for at least 3 days.

The Tristimulus Y-value (Y) on the black and white portions of the coating respectively. Tristimulus Y-value measurements were performed using a colorimeter consisting of an Ocean Optics ISP-REF integrating sphere with a 0.4" sampling aperture connected to an Ocean Optics USB 4000 Spectrometer through a fiber optic cable. All measurements were performed with D65/10° illumination.

The opacity is the percentage of the tristimulus Y-value of the coating on a black substrate to that on a white substrate.

$$\text{Opacity} = \frac{Y_{black}}{Y_{white}} * 100\%$$

The present invention may be embodied in other forms without departing from the spirit and the essential attributes thereof, and, accordingly, reference should be made to the appended claims, rather than to the foregoing specification, as indicating the scope of the invention.

We claim:

1. A coating composition comprising:
(a) a dispersion comprising the melt blending of:
from 20 to 70% by weight of one or more base polymers, based on the total weight of the solid content of the dispersion, wherein said one or more base polymers are one or more thermoplastic polymers selected from the group consisting of copolymers of ethylene and one or more alpha-olefins, and copolymers of propylene and one or more alpha-olefins;
from 30 to 95% by weight of at least one first pigment, based on the total solid content of the dispersion, wherein said first pigment is a metal oxide selected from the group consisting of $TiO_2$, $SiO_2$, ZnO, $Al_2O_3$, and combinations thereof; and wherein said first pigment has an average particle size diameter in the range of from 0.1 to 1 μm; from 1 to 50% by weight of one or more stabilizing agents, based on total weight of the solid content of the dispersion;
in the presence of water and one or more neutralizing agent in an extruder, wherein the content of water is from 35 to 70% by volume, based on the total volume of the dispersion,
wherein said at least first one pigment is partially encapsulated by said one or more base polymers, wherein said dispersion comprises (b) a binder composition that is selected from the group consisting of acrylic latex, vinyl acrylic latex, styrene acrylic latex, vinyl acetate ethylene latex, and combinations thereof.

2. A method for producing a coating composition comprising the steps of:
selecting at least one first pigment, wherein said first pigment is a metal oxide selected from the group consisting of $TiO_2$, $SiO_2$, ZnO, $Al_2O_3$, and combinations thereof; and wherein said first pigment has an average particle size diameter in the range of from 0.1 to 1 μm;
selecting one or more base polymers, wherein said one or more base polymers are one or more thermoplastic polymers selected from the group consisting of copolymers of ethylene and one or more alpha-olefins, and copolymers of propylene and one or more alpha-olefins
selecting one or more stabilizing agents;
melt blending 30 to 95% by weight of said first pigment, based on the total weight of the solid content of the dispersion, and 20 to 70% by weight of said one or more base polymers, based on the total weight of the solid content of the dispersion, in the presence of 1 to 50% by weight of said one or more stabilizing agent, based on the total weight of the solid content of the dispersion, one or more neutralizing agents, and water; wherein the content of water is from 35 to 70% by volume, based on the total volume of the dispersion,
thereby at least partially encapsulating said first pigment with said one or more base polymers, and wherein at least partially encapsulating said first pigment with said one or more base polymers are dispersed in the water;
thereby forming a dispersion;
admixing said dispersion with a binder composition, wherein the binder composition that is selected from the group consisting of acrylic latex, vinyl acrylic latex, styrene acrylic latex, vinyl acetate ethylene latex, and combinations thereof; and
thereby forming a coating composition.

3. A coated substrate comprising:
a substrate; and
the coating composition of claim 1 associated with said substrate.

4. A method of making a coated article comprising the steps of:
selecting a substrate;
selecting the coating composition of claim 1;
applying said coating composition to said substrate;
optionally removing at least a portion of said water;
thereby forming said coated article.

5. A method of improving opacity of a coating composition comprising the steps of:
- selecting at least one first pigment, wherein said first pigment is a metal oxide selected from the group consisting of $TiO_2$, $SiO_2$, $ZnO$, $Al_2O_3$, and combinations thereof; and wherein said first pigment has an average particle size diameter in the range of from 0.1 to 1 μm;
- selecting one or more base polymers, wherein said one or more base polymers are one or more thermoplastic polymers selected from the group consisting of copolymers of ethylene and one or more alpha-olefins, and copolymers of propylene and one or more alpha-olefins
- selecting one or more stabilizing agents;
- melt blending 30 to 95% by weight of said first pigment, based on the total weight of the solid content of the dispersion, and 20 to 70% by weight of said one or more base polymers, based on the total weight of the solid content of the dispersion, in the presence of 1 to 50% by weight of said one or more stabilizing agent, based on the total weight of the solid content of the dispersion, one or more neutralizing agents, and water; wherein the content of water is from 35 to 70% by volume, based on the total volume of the dispersion,
- thereby at least partially encapsulating said first pigment with said one or more base polymers, and wherein at least partially encapsulating said first pigment with said one or more base polymers are dispersed in the water;
- thereby forming a dispersion;
- admixing said dispersion with a binder composition, wherein the binder composition that is selected from the group consisting of acrylic latex, vinyl acrylic latex, styrene acrylic latex, vinyl acetate ethylene latex, and combinations thereof; and
- thereby forming a coating composition having improved opacity.

6. The coating composition according to claim 1, wherein said neutralizing agent is selected from the group consisting of hydroxides, amines, carbonates, and combinations thereof.

7. The coating composition according to any of the claims 1-5, wherein said coating composition further comprises optionally one or more fillers, optionally one or more additives, optionally one or more second pigments, optionally one or more solvents, optionally one or more surfactant, optionally one or more defoamers, optionally one or more preservatives, optionally one or more thickeners, or optionally one or more second neutralizing agents.

8. The coating composition according to claim 7, wherein said one or more second pigments are selected from the group consisting of mica, calcium carbonate, silica, zinc oxide, clay, and combinations thereof.

9. The coating composition according to claim 7, wherein said one or more solvents are selected from the group consisting of glycols, glycol ethers, 2,2,4-trimethyl-1,3-pentanediol monoisobutyrate, alcohols, mineral spirits, benzoate esters, and mixtures thereof.

10. The coating composition according to claim 7, wherein said one or more preservatives are selected from the group consisting of biocides, mildewcides, fungicides, algaecides, and combinations thereof, and wherein said one or more thickeners are selected from the group consisting of cellulosic thickeners, hydrophobically modified alkali soluble emulsions, hydrophobically modified ethoxylated urethane thickeners, and combinations thereof, and wherein said one or more second neutralizing agents are selected from the group consisting of hydroxides, amines, carbonates, and combinations thereof.

* * * * *